United States Patent
Chang et al.

(10) Patent No.: US 10,911,733 B2
(45) Date of Patent: Feb. 2, 2021

(54) LIGHT FIELD DISPLAY APPARATUS AND METHOD

(71) Applicant: Coretronic Corporation, Hsin-Chu (TW)

(72) Inventors: Chuan-Chung Chang, Hsin-Chu (TW); Hsin-Hsiang Lo, Hsin-Chu (TW); Han-Hsuan Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 88 days.

(21) Appl. No.: 16/231,965

(22) Filed: Dec. 25, 2018

(65) Prior Publication Data
US 2019/0208175 A1    Jul. 4, 2019

(30) Foreign Application Priority Data

Dec. 29, 2017   (CN) .......................... 2017 1 1469055

(51) Int. Cl.
*H04N 13/122* (2018.01)
*H04N 13/305* (2018.01)
(Continued)

(52) U.S. Cl.
CPC ........... *H04N 13/122* (2018.05); *G02B 30/00* (2020.01); *G02B 30/27* (2020.01); *G02B 30/36* (2020.01);
(Continued)

(58) Field of Classification Search
CPC .................................................. H04N 13/122
(Continued)

(56) References Cited

U.S. PATENT DOCUMENTS

2016/0000535 A1*  1/2016  Atiya .................. A61B 5/0022
                                                                    433/29
2016/0142615 A1   5/2016  Liang
(Continued)

FOREIGN PATENT DOCUMENTS

CN    101546044    9/2009
CN    102439979    5/2012
(Continued)

OTHER PUBLICATIONS

Hong Hua, et al., "A 3D integral imaging optical see-through head-mounted display," Optics Express, vol. 22, Jun. 2014, pp. 13484-13491.
(Continued)

*Primary Examiner* — Yulin Sun
(74) *Attorney, Agent, or Firm* — JCIPRNET

(57) ABSTRACT

A light field display apparatus includes a display, a lens array, a plurality of optical devices, and a computing device. The display emits a light field image beam to a projection target. The lens array is disposed on a transmission path of the light field image beam and located between the display and the projection target. The optical devices are disposed on the transmission path of the light field image beam. The computing device is electrically connected to the display to receive an image signal having depth information and convert the image signal having the depth information into a light field image signal. The light field image signal is transmitted to the display. The computing device converts the image signal having the depth information into the light field image signal by an equivalent optical model. A light field display method is also provided.

26 Claims, 7 Drawing Sheets

(51) Int. Cl.
*H04N 13/307* (2018.01)
*G02B 30/00* (2020.01)
*G02B 30/27* (2020.01)
*G02B 30/36* (2020.01)

(52) U.S. Cl.
CPC ......... *H04N 13/305* (2018.05); *H04N 13/307* (2018.05)

(58) Field of Classification Search
USPC .......................................................... 348/135
See application file for complete search history.

(56) References Cited

U.S. PATENT DOCUMENTS

2019/0011884 A1* 1/2019 Zhang ................... G02B 30/27
2019/0154439 A1* 5/2019 Binder ................... G01S 15/08

FOREIGN PATENT DOCUMENTS

| | | |
|---|---|---|
| CN | 104427325 | 3/2015 |
| CN | 104777622 | 7/2015 |
| CN | 106254804 | 12/2016 |
| CN | 106961557 | 7/2017 |
| KR | 100622556 | 9/2006 |

OTHER PUBLICATIONS

Kaikai Yao, "Method for Fast Generation of Integrated Imaging Three-Dimensional Display Micro Unit Image Array", Information Science and Technology of China Masters' Theses Full-text Database, Oct. 16-Nov. 15, 2014, with English translation thereof, pp. 1-13.

"Office Action of China Counterpart Application", dated Nov. 4, 2020, p. 1-p. 15.

* cited by examiner

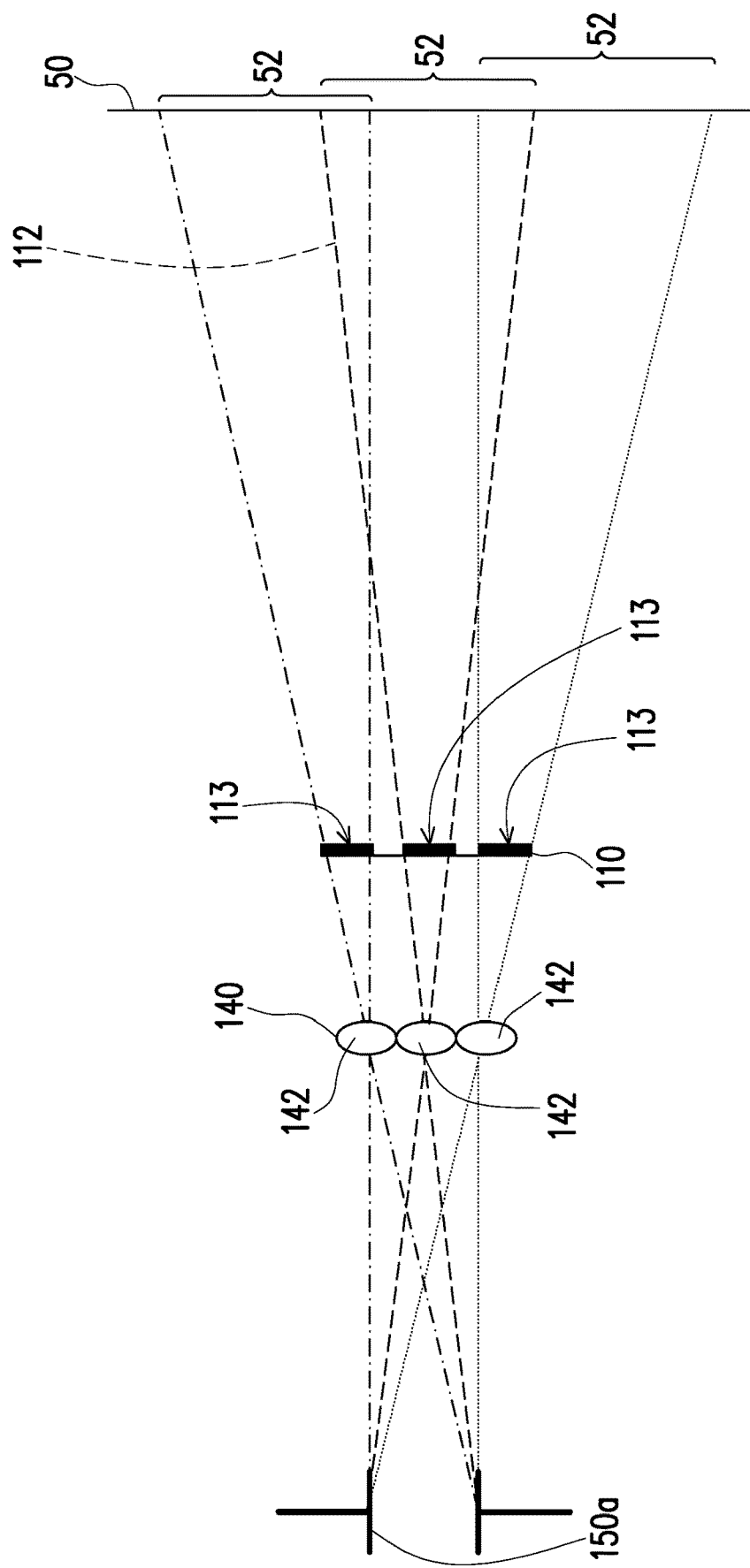

LIGHT FIELD DISPLAY APPARATUS AND METHOD

CROSS-REFERENCE TO RELATED APPLICATION

This application claims the priority benefit of China application serial no. 201711469055.7, filed on Dec. 29, 2017. The entirety of the above-mentioned patent application is hereby incorporated by reference herein and made a part of this specification.

BACKGROUND

Technical Field

The invention relates to a display apparatus and a display method, and more particularly relates to a light field display apparatus and a light field display method.

Description of Related Art

As the display technology advances, the general flat display or stereoscopic display can no longer fully satisfy the users' demand for better visual experience. Therefore, in recent years, virtual reality display technology has started to flourish. The stereoscopic visual effect produced by the common virtual reality technology is achieved by using two flat display images with parallax. Although this approach allows the user's brain to sense and see stereoscopic images of different depths (i.e., distances), the human eye's crystalline lens is actually focused on the flat images at a fixed distance. Therefore, the mismatch therebetween may easily cause the user to feel dizzy and uncomfortable.

In contrast, the light field display technology, in principle, provides all the light information in the given space, including light color, luminance, direction, and distance. In other words, the light field display technology can produce true information of depth of field and therefore can solve the problem of discomfort that the user experiences when using virtual reality and make the experience seem more real.

In terms of the quality of the images displayed by a light field display apparatus, the quality of the images seen by the user is not only related to the optical design of the display apparatus but also related to the pre-processed images inputted to the display panel, and the calculation method of the pre-processed image is also related to the optical architecture of the light field display apparatus adopted. Regarding the pre-processed image, a common calculation method is to regard the imaging model of the optical device as a pinhole camera, so that the inputted image can be converted into a processed image required for light field near-eye display through the pinhole imaging model. However, there is difference in the imaging models between the pinhole model and the actual light field device. For this reason, the pre-processed image calculated by using the pinhole model may easily cause the image seen by the user to be inaccurate and result in an image blur.

The information disclosed in this "BACKGROUND" section is only for enhancement of understanding of the background of the described technology and therefore it may contain information that does not form the prior art that is already known to a person of ordinary skill in the art. Further, the information disclosed in the "BACKGROUND" section does not mean that one or more problems to be resolved by one or more embodiments of the invention were acknowledged by a person of ordinary skill in the art.

SUMMARY

The invention provides a light field display apparatus that allows the user to see images with favorable quality.

The invention provides a light field display method that allows the user to see images with favorable quality.

Other objects and advantages of the invention may be understood from the technical features of the invention.

For one or some or all of the aforementioned objects or for other objects, according to an embodiment of the invention, a light field display apparatus is provided, which includes a display, a lens array, a plurality of optical devices, and a computing device. The display is configured to emit a light field image beam to a projection target. The lens array is disposed on a transmission path of the light field image beam and located between the display and the projection target. The optical devices are disposed on the transmission path of the light field image beam. The computing device is electrically connected to the display and configured to receive an image signal having depth information and convert the image signal having the depth information into a light field image signal. The light field image signal is transmitted to the display. The computing device converts the image signal having the depth information into the light field image signal by an equivalent optical model. The equivalent optical model is equivalent to an optical system composed of the display, the lens array, the optical devices, and the projection target.

According to an embodiment of the invention, a light field display apparatus is provided, which includes a display, a lens array, a polarizer, a polarization selection device, a light shifting device, and a computing device. The display is configured to emit a light field image beam to a projection target. The lens array is disposed on a transmission path of the light field image beam and located between the display and the projection target. The polarization selection device is disposed between the polarizer and the lens array. The light shifting device is disposed between the polarization selection device and the lens array. The computing device is electrically connected to the display and configured to receive an image signal having depth information and convert the image signal having the depth information into a light field image signal. The light field image signal is transmitted to the display.

According to an embodiment of the invention, another light field display apparatus is provided, which includes a display, a lens array, a polarization selection device, a light shifting device, and a computing device. The display is configured to emit a light field image beam to a projection target, wherein the display is a liquid crystal display and configured to emit a light field image beam that is polarized. The lens array is disposed on a transmission path of the light field image beam and located between the display and the projection target. The polarization selection device is disposed between the display and the lens array. The light shifting device is disposed between the polarization selection device and the lens array. The computing device is electrically connected to the display and configured to receive an image signal having depth information and convert the image signal having the depth information into a light field image signal. The light field image signal is transmitted to the display.

According to an embodiment of the invention, a light field display method is provided, which includes: converting an image signal having depth information into a light field image signal by an equivalent optical model; and transmitting the light field image signal to a display, wherein the equivalent optical model is equivalent to an optical system composed of the display, a lens array, a plurality of optical devices, and a projection target. The equivalent optical model is a system composed of a plurality of equivalent devices. The equivalent devices include a plurality of first principal points and a plurality of second principal points of a plurality of equivalent sub-lenses of an equivalent lens array, a display surface of the display, a vertex of a surface of the lens array that faces the projection target, a vertex of a surface of the lens array that faces the display, and an equivalent projection target. The display is configured to emit a light field image beam to the projection target. The lens array is disposed on a transmission path of the light field image beam and located between the display and the projection target. The optical devices are disposed on the transmission path of the light field image beam.

Based on the above, the embodiments of the invention achieve at least one of the following. In the light field display apparatus and the light field display method according to the embodiments of the invention, the equivalent optical model equivalent to the optical system composed of the display, the lens array, multiple optical devices, and the projection target is adopted to convert the image signal having the depth information into the light field image signal. As a result, the user can see images with favorable quality. In addition, in the light field display apparatus of the embodiments of the invention, the polarization selection device and the light shifting device are used to improve the resolution of the images, which allows the user to see images with favorable quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIG. 3 illustrates a virtual image and light field image segment regions of the light field display apparatus of FIG. 1A and their corresponding relationships with a lens array and a display.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
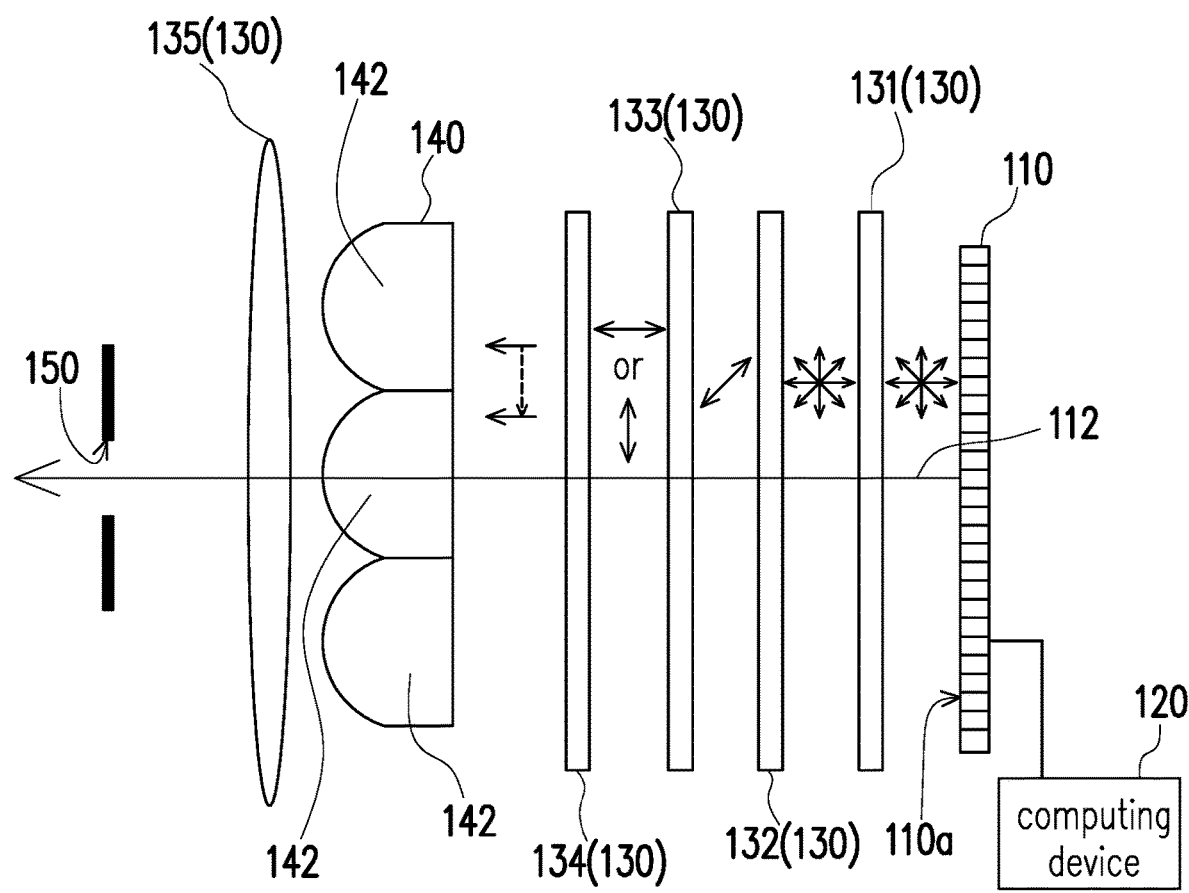
FIG. 1A is a schematic diagram of a light field display apparatus according to an embodiment of the invention.
Figure 1B:
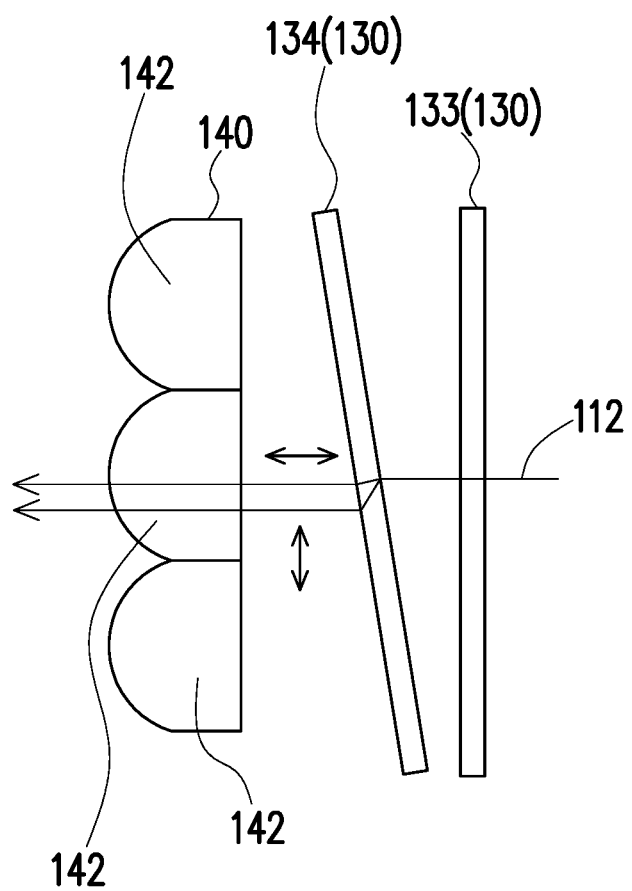
FIG. 1B is a detailed schematic diagram illustrating a polarization selection device and a light shifting device of FIG. 1A and a light field image beam transmitted therein.

FIG. 1A is a schematic diagram of a light field display apparatus according to an embodiment of the invention. FIG. 1B is a detailed schematic diagram illustrating a polarization selection device and a light shifting device of FIG. 1A and a light field image beam transmitted therein. Referring to FIG. 1A and FIG. 1B, a light field display apparatus 100 of this embodiment includes a display 110, a lens array 140, a plurality of optical devices 130, and a computing device 120. The display 110 is configured to emit a light field image beam 112 to a projection target 150. In this embodiment, the projection target 150 is, for example, a pupil of a user, and the light field image beam 112 may form an image on a retina of the human eye. The disclosure is mainly directed to the light field display apparatus 100, in which the display 110 is used to emit the light field image beam 112 to the projection target 150. In this embodiment, the display 110 is self-luminous, but the invention is not limited thereto. In another embodiment, the display may be a non-self-luminous display (for example, a display with a backlight source). In this embodiment, the display 110 is configured to emit the non-polarized light field image beam 112, such as a randomly-polarized light field image beam. The self-luminous display is, for example, an organic light-emitting diode (OLED) display, a light-emitting diode (LED) display, a micro light-emitting diode (Micro LED) display, or other suitable displays. In other embodiments, the display is a non-self-luminous display, such as a liquid crystal display (LCD), a digital micro-mirror device (DMD), or other suitable displays.

In this embodiment, the lens array 140 is disposed on a transmission path of the light field image beam 112 and is located between the display 110 and the projection target 150. The optical devices 130 are disposed on the transmission path of the light field image beam 112. In this embodiment, the optical devices 130 include a cover 131, a polarizer 132, a polarization selection device 133, and a light shifting device 134. The cover 131 is disposed between the display 110 and the lens array 140. A material of the cover 131 is a transparent material, such as glass. The polarizer 132 is disposed between the cover 131 and the lens array 140 to convert the light field image beam 112 emitted by the display 110 into a light field image beam 112 having a specific polarization characteristic. The polarization selection device 133 is disposed between the polarizer 132 and the lens array 140. The polarization selection device 133 is, for example, a liquid crystal cell. The direction of the liquid crystal in the liquid crystal cell may be changed by generation of an electric field, so as to change a specific polarization direction of the light field image beam 112 from the polarizer 132. For example, a linear polarization direction of the light field image beam 112 that is inclined 45 degrees with respect to the horizontal direction may be changed to a horizontal polarization direction or a vertical polarization direction. Those skilled in the art should understand that the double arrows beside the light field image beam 112, as shown in FIG. 1A, represent the polarization directions of the light field image beam 112 on a plane parallel to the polarizer 132. The lens array 140 includes a plurality of sub-lenses 142 arranged in an array. In other embodiments, a plurality of lens arrays 140 may be disposed at the position of the lens array 140 by optical design. In other embodiments, the lens array 140 may be a fly-eye lens array, but the invention is not limited thereto.

The light shifting device 134 is disposed between the polarization selection device 133 and the lens array 140. In an embodiment, a material of the light shifting device 134 is a birefringent material, and the light shifting device 134 has different refractive indexes for lights with different polarization directions (e.g., the horizontal polarization direction and the vertical polarization direction), and the birefringent material of the light shifting device 134 may be tilted relative to the polarization selection device 133 (as shown in FIG. 1B). As a result, the different refractive indexes cause the light of different polarization directions to have different shifting amounts after the light passes through the light shifting device 134. For example, in FIG. 1A, between the light shifting device 134 and the lens array 140, the dotted arrow represents the shifting of the light field image beam 112.

When the polarization selection device 133 changes the liquid crystal direction therein alternately and rapidly to generate the light field image beam 112 in the horizontal polarization direction and the vertical polarization direction alternately, the light shifting device 134 makes it possible to generate the light field image beam 112 with different shifting amounts alternately. Thus, the resolution of the final image seen by the human eye after the human eye receives the light field image beam 112 may be improved by the principle of time multiplexing, which allows the user to see images with favorable quality. However, the light shifting device 134 of the disclosure is not limited to the above structure, and the light shifting device 134 may also have other structures with the birefringent material as long as the light shifting device 134 has different refractive indexes corresponding to different polarization directions for causing the light in different polarization directions to have different shifting amounts. For example, the light shifting device 134 is made of a birefringent material, such as an anisotropic material (uniaxial crystal, such as calcite, quartz, and ruby), but the invention is not limited thereto. In other structures, the light shifting device 134 is, for example, a liquid crystal layer, but the invention is not limited thereto.

Figure 2A:
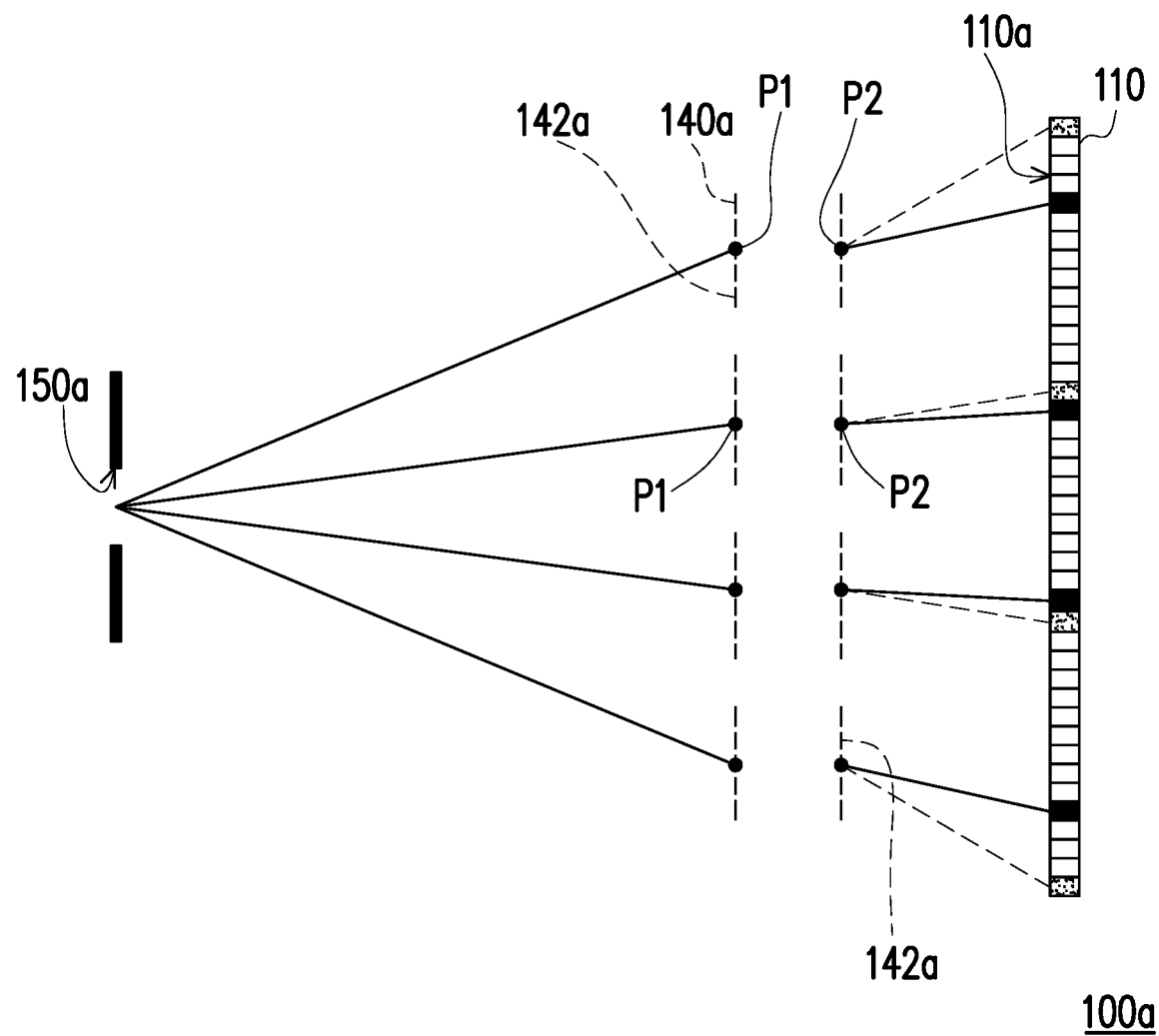
FIG. 2A illustrates an equivalent optical model of the light field display apparatus of FIG. 1A, which is a model including a plurality of equivalent sub-lenses.
Figure 2B:
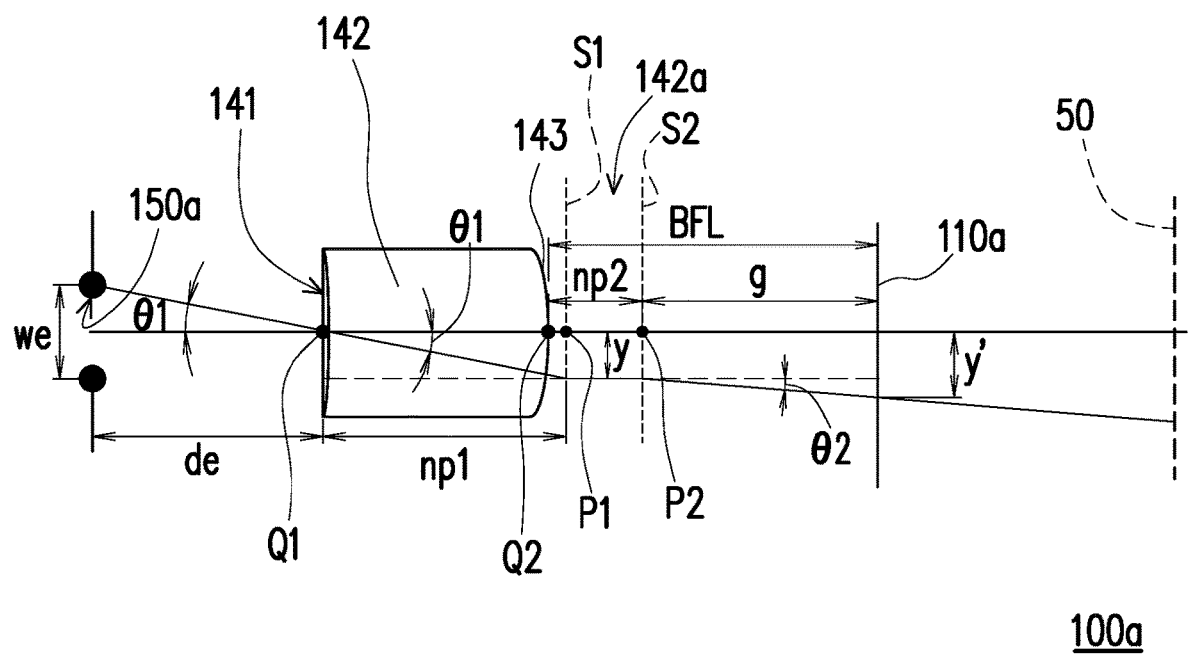
FIG. 2B is a detailed model including one of the equivalent sub-lenses in the equivalent optical model of FIG. 2A.

FIG. 2A illustrates an equivalent optical model of the light field display apparatus of FIG. 1A, which is a model including a plurality of equivalent sub-lenses, and FIG. 2B is a detailed model including one of the equivalent sub-lenses in the equivalent optical model of FIG. 2A. Referring to FIG. 1A, FIG. 2A, and FIG. 2B, the computing device 120 is electrically connected to the display 110 and is configured to receive an image signal having depth information and convert the image signal having the depth information into a light field image signal. It should be noted that the image signal having the depth information may be transmitted from an external image source (not shown) to the computing device 120 or the image signal having the depth information may be directly stored in the computing device 120 having a storage device (not shown). The storage device is, for example, a random access memory (RAM), a read-only memory (ROM), a flash memory, a similar device, or a combination of the foregoing. The light field image signal is transmitted to the display 110. The computing device 120 converts the image signal having the depth information into the light field image signal by an equivalent optical model 100a (as shown in FIG. 2A and FIG. 2B). The equivalent optical model 100a is equivalent to an optical system composed of the display 110, the lens array 140, the optical devices 130, and the projection target 150. The equivalent optical model 100a is a system composed of a plurality of equivalent devices, and the equivalent devices include a plurality of first principal points P1 and a plurality of second principal points P2 of a plurality of equivalent sub-lenses 142a (arranged in an array) of the equivalent lens array 140a, and a display surface 110a of the display 110. Referring to FIG. 2B, a vertex Q1 of a surface 141 of the lens array 140 that faces the projection target 150 (i.e., the vertex Q1 of the surface 141 of the sub-lens 142), a vertex Q2 of a surface 143 of the lens array 140 that faces the display 110 (i.e., the vertex Q2 of the surface 143 of the sub-lens 142), and an equivalent projection target 150a, wherein the vertex Q1 and the vertex Q2 refer to the geometrical center positions on the surface 141 and the surface 143 of the sub-lenses 142. The equivalent optical model 100a has taken the shifting of the light, which occurs when the light passes through these optical devices 130, into consideration. Therefore, as shown in FIG. 2A, the dotted line of FIG. 2A represents the light in the case where the shifting of the light, which occurs when the light passes through the optical devices 130, is not taken into consideration, and the solid line of FIG. 2A represents the light in the case where the shifting of the light, which occurs when the light passes through the optical devices 130, is taken into consideration. It is known from FIG. 2A that there is a pitch of one to several pixels between the positions, to which the light with consideration of light shifting and the light without consideration of light shifting correspond on the display surface 110a. Such a difference enables the light field display apparatus 100 of this embodiment to provide the user with clearer images. In addition, in this embodiment, when the image signal having the depth information is converted into the light field image signal by the equivalent optical model 100a, the number of the optical devices 130 that need to be considered is minimized without compromising the executability and computational efficiency of the algorithm.

In this embodiment, referring to FIG. 1A and FIG. 2A, the optical devices 130 further include a lens 135 disposed between the lens array 140 and the projection target 150. The equivalent projection target 150a included in the equivalent devices may be equivalent to a combination of the lens 135 and the projection target 150. However, in other embodiments, the optical devices 130 may not include the lens 135. In that case, the equivalent projection target 150a is the projection target 150.

In this embodiment, a plurality of parameters that are used when the computing device 120 uses the equivalent optical model 100a include a size we of the equivalent projection target 150a (e.g., a diameter of an equivalent pupil), a distance de from the equivalent projection target 150a to the vertices Q1 of the surfaces 141 of the sub-lenses 142, positions of the first principal points P1 and the second principal points P2 of the equivalent sub-lenses 142a, a focal length of the equivalent sub-lenses 142a, and a distance g from the second principal points P2 of the equivalent sub-lenses 142a to the display 110a.

FIG. 3 illustrates a virtual image and light field image segment regions of the light field display apparatus of FIG. 1A and their corresponding relationships with the lens array and the display. In this embodiment, when the computing device 120 converts the image signal having the depth information into the light field image signal by the equivalent optical model 100a, the computing device 120 first obtains the content of the light field image required, the displaying distance of the light field image (e.g., the distance between a virtual image 50 seen by the eyes of the user and the eyes of the user), and the displaying size of the light field image (e.g., the size of the virtual image 50), and then combines these parameters to calculate a plurality of light field image segment regions 52 corresponding to the equivalent projection target 150a, wherein the light field image segment regions 52 respectively correspond to the sub-lenses 142 of the lens array 140, and the adjacent light field image segment regions 52 partially overlap each other. The computing device completes calculation of a plurality of light field segment images 113 respectively corresponding to the sub-lenses 142, arranges the light field segment images 113 according to the arrangement of the sub-lenses 142, and outputs the light field segment images 113 to the display 110. In other words, the light field segment images 113 may be calculated more accurately by using the equivalent optical model 100a, and through the light field image beam 112 with the light field segment images 113 is projected by using the display 110, the images seen by the human eye become more accurate and clearer. In addition, the human eye may also see stereoscopic light field images. Furthermore, the light field segment images 113 refer to the images displayed on the display 110.

For example, as shown in FIG. 2B, it is assumed that the size we of the equivalent projection target 150a (e.g., the diameter of the user's pupil) is 6 mm, the distance de from the equivalent projection target 150a to the vertices Q1 of the sub-lenses 142 is 20 mm, the distance np1 from the vertex Q1 of the surface 141 of the sub-lens 142 to the first principal point P1 of the equivalent sub-lens 142a is −1 mm, the distance np2 from the vertex Q2 of the surface 143 of the sub-lens 142 to the second principal point P2 of the equivalent sub-lens 142a is 1 mm, the focal length f of the sub-lens 142 is 5.2 mm, and the back focal length (BFL) of the sub-lens 142 is 5.3 mm (i.e., the distance from the vertex Q2 to the display surface 110a). When the middle sub-lens 142 is taken into consideration, the light from an edge of the equivalent projection target 150a (i.e., the equivalent pupil) has a height y on a first principal plane S1 of the equivalent sub-lens 142a after passing through the vertex Q1, and $y=-np1 \times \tan(\theta 1)=-np1 \times (we/2)/de=-1 \times (6/2)/20=-0.15$, wherein the angle $\theta 1=-8.53°$. On a second principal plane S2 of the equivalent sub-lens 142a, the phenomenon of light refraction due to the sub-lens 142 needs to be taken into consideration. Thus, through the paraxial formula, it is obtained that $\sin(\theta 2)=\sin(\theta 1)-y/f=-\sin(8.53°)+0.15/5.2$, and the angle $\theta 2=-6.86°$. Finally, y' is the height of the light on the display surface 110a, and $y'=y+(BFL-np2) \times \tan(\theta 2)=-0.517-0.15=-0.667$. Thereby, the height y' of the image at the intersection of the extension line of the light and the virtual image 50, which should be displayed on the display surface 110a, is obtained. The value of BFL-np2 is the distance g from the second principal points P2 of the equivalent sub-lenses 142a to the display 110a.

In an embodiment, when the computing device 120 converts the image signal having the depth information into the light field image signal by the equivalent optical model 100a, by looking up a table or numerical fitting, the computing device 120 further corrects a difference in position between the light field segment images 113 calculated from the equivalent optical model 100a and the actual optical system. In other words, the difference information between the mark position of each light field segment image, calculated based on the actual optical configuration corresponding to the light field display apparatus 100 in the actual light trace, and the light field segment image position of the equivalent optical model 100a is obtained first, and the difference information is combined with the equivalent optical model 100a to obtain a more accurate light field image recombination result. That is, the most detailed value table is calculated first, and when the other light field display apparatuses 100 leave the factory, the values may be adjusted and optimized by using this value table. As a result, the user's eyes can see images with better quality, e.g., clearer images or less distorted images.

In an embodiment, when the computing device 120 converts the image signal having the depth information into the light field image signal by the equivalent optical model 100a, the computing device 120 first processes the content of the required light field image in a manner equivalent to equidistant or non-equidistant enlargement or minification caused by the equivalent sub-lenses (for example, when considering the factor that the traveling distance of the inverse trace of the light from the projection target 150 to the virtual image 50 through the sub-lens 142 close to the edge of the lens array 140 is longer than the traveling distance of the inverse trace of the light to the virtual image 50 through the sub-lens 142 close to the center of the lens array), and then calculates the light field image segment regions 52 corresponding to the equivalent projection target 150. As a result, the user's eyes can see images with better quality, e.g., clearer images or less distorted images. In an embodiment, the aforementioned method of looking up a table or numerical fitting and the aforementioned processing of equidistant or non-equidistant enlargement or minification may both be executed by the computing device 120, so that the user's eyes may see images with better quality, e.g., clearer images or less distorted images.

In addition, in this embodiment, when the required light field image has a plurality of light field sub-images of different distances (that is, the virtual image 50 may be divided into a plurality of sub-virtual images of different distances), the computing device 120 causes the light field sub-image closer to the projection target 150 to shield the light field sub-image further away from the projection target 150. To be more specific, the computing device 120 picks out overlapped image regions among the light field sub-images of different distances, and removes the overlapped image regions of the light field sub-images further away from the projection target 150 according to the distance information of the light field sub-images, and only displays the overlapped image regions of the light field sub-images that are closer to the projection target 150. In other words, the human eye only sees the light field sub-images that are closer to the projection target 150 while the light field sub-images further away from the projection target 150 are shielded. That is, when the image has a depth of field, using the near object to shield the distant object creates the depth of field.

In an embodiment, the computing device 120 is, for example, a central processing unit (CPU), a microprocessor, a digital signal processor (DSP), a programmable controller, a programmable logic device (PLD), other similar devices, or a combination of these devices, but the invention is not limited thereto. In addition, in an embodiment, each function of the computing device 120 may be implemented as a plurality of program codes. The program codes are stored in the storage device to be executed by the computing device 120.

Alternatively, in an embodiment, each function of the computing device 120 may be implemented as one or more circuits. The invention is not intended to limit whether each function of the computing device 120 is implemented by software or hardware.

Figure 4:
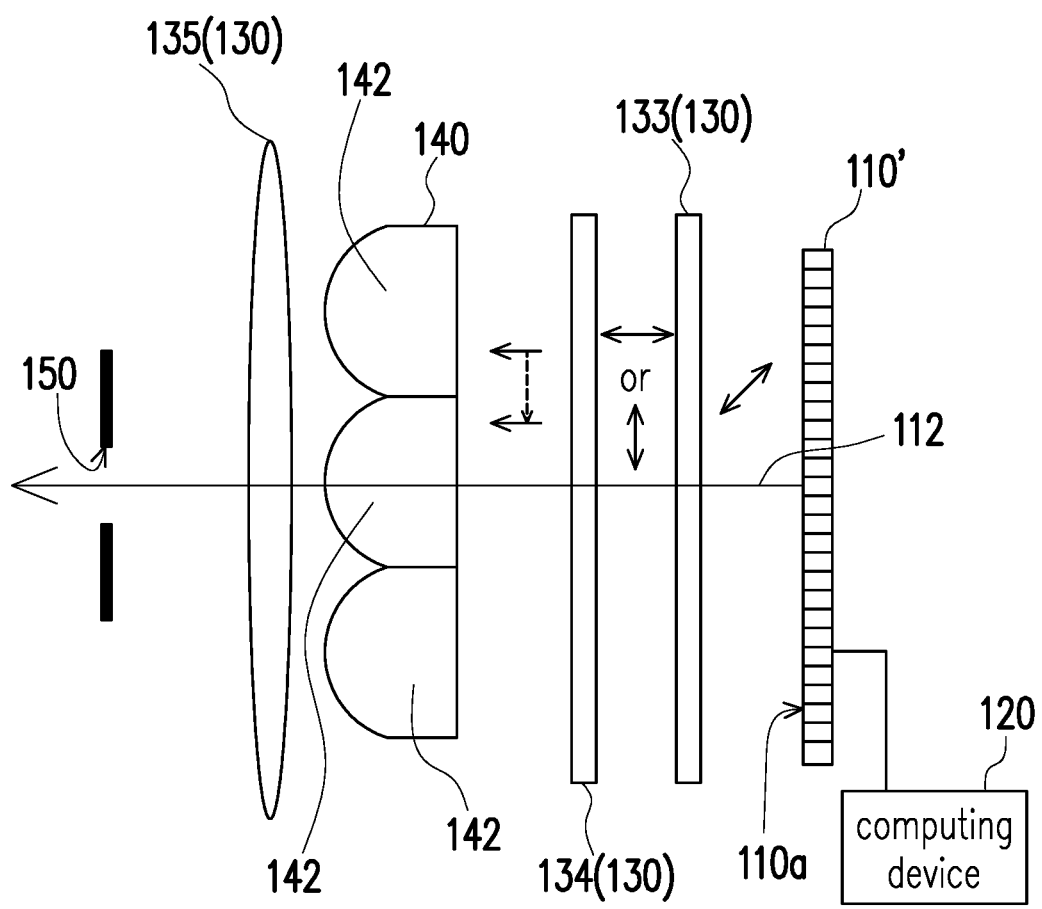
FIG. 4 is a schematic diagram of a light field display apparatus according to another embodiment of the invention.

FIG. 4 is a schematic diagram of a light field display apparatus according to another embodiment of the invention. Referring to FIG. 4, the light field display apparatus 200 of this embodiment is similar to the light field display apparatus 100 of FIG. 1A, and a difference therebetween is described as follows. In this embodiment, a display 110' of the light field display apparatus 200 is a liquid crystal display and is configured to emit a polarized light field image beam 112, so that the polarizer 132 of FIG. 1A may be omitted. Therefore, in this embodiment, the polarization selection device 133 is disposed between the display 110' and the lens array 140, and the light shifting device 134 is disposed between the polarization selection device 133 and the lens array 140. In this embodiment, the optical devices 130 in the optical system equivalent to the equivalent optical model used by the computing device 120 of the light field display apparatus 200 include the polarization selection device 133, the light shifting device 134, and the lens 135.

Figure 5:
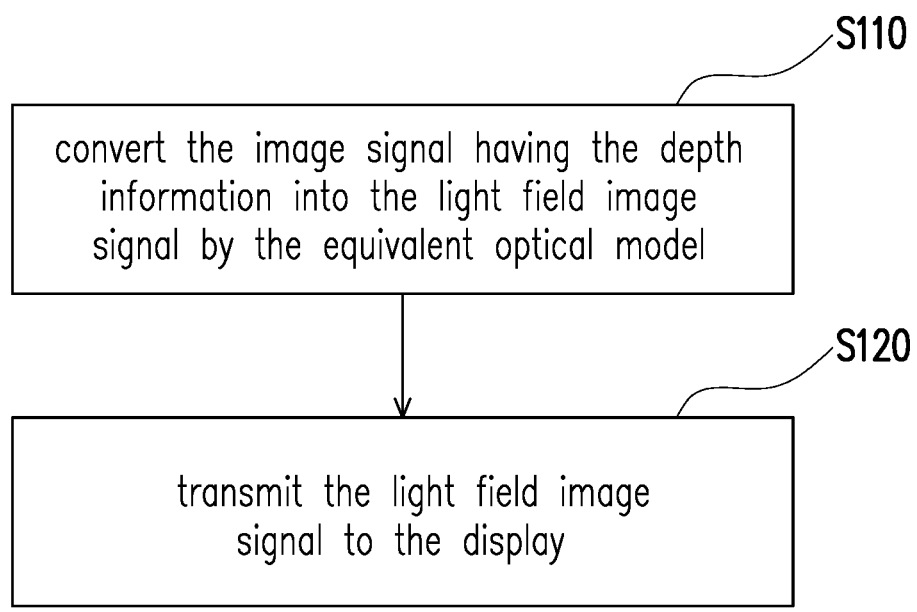
FIG. 5 is a flowchart of a light field display method according to an embodiment of the invention.

FIG. 5 is a flowchart of a light field display method according to an embodiment of the invention. Referring to FIG. 1A, FIG. 4, and FIG. 5, the light field display method of this embodiment is applicable to the light field display apparatus 100 of FIG. 1A or the light field display apparatus 200 of FIG. 4, and the method may be performed by the computing device 120. The light field display method of this embodiment includes the following steps. First, Step S110 is performed to convert the image signal having the depth information into the light field image signal by the equivalent optical model 110*a* (as shown in FIG. 2A and FIG. 2B). Details of Step S110 have been described in the detailed step executed by the computing device 120 in the foregoing embodiment and thus will not be repeated here. Then, Step S120 is performed to transmit the light field image signal to the display 110 or 110'. Details of Step S120 have been described in the detailed step executed by the computing device 120 in the foregoing embodiment and thus will not be repeated here.

To sum up, the embodiments of the invention achieve at least one of the following. In the light field display apparatus and the light field display method according to the embodiments of the invention, the equivalent optical model equivalent to the optical system composed of the display, the lens array, a plurality of optical devices, and the projection target is adopted to convert the image signal having the depth information into the light field image signal. As a result, the user can see images with favorable quality. In addition, in the light field display apparatus of the embodiments of the invention, the polarization selection device and the light shifting device are used to improve the resolution of the images, which allows the user to see images with favorable quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light field display apparatus comprising:
    a display configured to emit a light field image beam to a projection target;
    a lens array disposed on a transmission path of the light field image beam and located between the display and the projection target;
    a plurality of optical devices disposed on the transmission path of the light field image beam; and
    a computing device electrically connected to the display and configured to receive an image signal having depth information, and the computing device converting the image signal having the depth information into a light field image signal, wherein the light field image signal is transmitted to the display, and the display is configured to generate and emit the light field image beam, and wherein the computing device converts the image signal having the depth information into the light field image signal by an equivalent optical model, and the equivalent optical model is equivalent to an optical system composed of the display, the lens array, the optical devices, and the projection target.

2. The light field display apparatus according to claim 1, wherein the equivalent optical model further comprises a plurality of equivalent devices, and the equivalent devices comprise a plurality of first principal points and a plurality of second principal points of a plurality of equivalent sub-lenses of an equivalent lens array, a display surface of the display, a vertex of a surface of the lens array that faces the projection target, a vertex of a surface of the lens array that faces the display, and an equivalent projection target.

3. The light field display apparatus according to claim 1, wherein the optical devices comprise:
    a polarizer disposed between the display and the lens array;
    a polarization selection device disposed between the polarizer and the lens array; and
    a light shifting device disposed between the polarization selection device and the lens array.

4. The light field display apparatus according to claim 3, wherein the display is a self-luminous display configured to emit the light field image beam that is non-polarized.

5. The light field display apparatus according to claim 1, wherein the optical devices comprise:
    a polarization selection device disposed between the display and the lens array; and
    a light shifting device disposed between the polarization selection device and the lens array, wherein the display is a liquid crystal display configured to emit the light field image beam that is polarized.

6. The light field display apparatus according to claim 2, wherein the optical devices further comprise a lens disposed between the lens array and the projection target.

7. The light field display apparatus according to claim 6, wherein the equivalent devices comprise the equivalent projection target, and the equivalent projection target is equivalent to a combination of the lens and the projection target.

8. The light field display apparatus according to claim 2, wherein a plurality of parameters that are used when the computing device uses the equivalent optical model comprise a size of the equivalent projection target, a distance from the equivalent projection target to the vertex of the surface that faces the equivalent projection target, positions of the first principal points and the second principal points of the equivalent sub-lenses, a focal length of the equivalent sub-lenses, and a distance from the second principal points of the equivalent sub-lenses to the display.

9. The light field display apparatus according to claim 8, wherein when the computing device converts the image signal having the depth information into the light field image signal by the equivalent optical model, the computing device first obtains a content of a light field image required and a displaying distance and a displaying size of the light field image, and then combines these parameters to calculate a plurality of light field image segment regions corresponding to the equivalent projection target, wherein the light field image segment regions respectively correspond to a plurality of sub-lenses of the lens array; the computing device completes calculation of a plurality of light field segment images respectively corresponding to the sub-lenses, arranges the plurality of light field segment images according to an arrangement of the sub-lenses, and outputs the plurality of light field segment images to the display.

10. The light field display apparatus according to claim 9, wherein when the computing device converts the image signal having the depth information into the light field image signal by the equivalent optical model, the computing device further corrects a difference in position between the plurality of light field segment images calculated from the equivalent optical model and the actual optical system by looking up a table or numerical fitting.

11. The light field display apparatus according to claim 9, wherein when the computing device converts the image signal having the depth information into the light field image signal by the equivalent optical model, the computing device first processes the content of the light field image required in a manner equivalent to equidistant or non-equidistant enlargement or minification caused by the equivalent sub-lenses, and then calculates the light field image segment regions corresponding to the equivalent projection target.

12. The light field display apparatus according to claim 9, wherein when the light field image required comprises a plurality of light field sub-images of different distances, the computing device causes a light field sub-image closer to the projection target to shield a light field sub-image farther away from the projection target.

13. A light field display apparatus comprising:
    a display configured to emit a light field image beam to a projection target;
    a lens array disposed on a transmission path of the light field image beam and located between the display and the projection target;
    a polarizer disposed between the display and the lens array;
    a polarization selection device disposed between the polarizer and the lens array;
    a light shifting device disposed between the polarization selection device and the lens array; and
    a computing device electrically connected to the display and configured to receive an image signal having depth information, and the computing device converting the image signal having the depth information into a light field image signal, wherein the light field image signal is transmitted to the display.

14. The light field display apparatus according to claim 13, further comprising a lens disposed between the lens array and the projection target.

15. The light field display apparatus according to claim 13, wherein the display is a self-luminous display configured to emit the light field image beam that is non-polarized.

16. A light field display apparatus comprising:
a display configured to emit a light field image beam to a projection target, wherein the display is a liquid crystal display configured to emit the light field image beam that is polarized;
a lens array disposed on a transmission path of the light field image beam and located between the display and the projection target;
a polarization selection device disposed between the display and the lens array;
a light shifting device disposed between the polarization selection device and the lens array; and
a computing device electrically connected to the display and configured to receive an image signal having depth information and convert the image signal having the depth information into a light field image signal, wherein the light field image signal is transmitted to the display.

17. The light field display apparatus according to claim 16, further comprising a lens disposed between the lens array and the projection target.

18. A light field display method comprising:
converting an image signal having depth information into a light field image signal by an equivalent optical model, wherein the equivalent optical model is equivalent to an optical system composed of a display, a lens array, a plurality of optical devices, and a projection target, and the equivalent optical model is a system composed of a plurality of equivalent devices, wherein the equivalent devices comprise a plurality of first principal points and a plurality of second principal points of a plurality of equivalent sub-lenses of an equivalent lens array, a display surface of the display, a vertex of a surface of the lens array that faces the projection target, a vertex of a surface of the lens array that faces the display, and an equivalent projection target, and the display is configured to emit a light field image beam to the projection target, the lens array is disposed on a transmission path of the light field image beam and located between the display and the projection target, and the optical devices are disposed on the transmission path of the light field image beam; and
transmitting the light field image signal to the display.

19. The light field display method according to claim 18, wherein the optical devices comprise a lens disposed between the lens array and the projection target.

20. The light field display method according to claim 19, wherein the equivalent devices comprise the equivalent projection target, and the equivalent projection target is equivalent to a combination of the lens and the projection target.

21. The light field display method according to claim 18, wherein a plurality of parameters that are used when the equivalent optical model is used comprise a size of the equivalent projection target, a distance from the equivalent projection target to the vertex of the surface that faces the equivalent projection target, positions of the first principal points and the second principal points of the equivalent sub-lenses, a focal length of the equivalent sub-lenses, and a distance from the second principal points of the equivalent sub-lenses to the display.

22. The light field display method according to claim 21, wherein converting the image signal having the depth information into the light field image signal by the equivalent optical model comprises:
obtaining a content, a displaying distance, and a displaying size of a light field image required;
combining these parameters to calculate a plurality of light field image segment regions corresponding to the equivalent projection target, wherein the light field image segment regions respectively correspond to a plurality of sub-lenses of the lens array; and
completing calculation of a plurality of light field segment images respectively corresponding to the sub-lenses, and arranging the plurality of light field segment images according to an arrangement of the sub-lenses.

23. The light field display method according to claim 22, wherein transmitting the light field image signal to the display further comprises: outputting the plurality of light field segment images to the display.

24. The light field display method according to claim 22, further comprising:
when converting the image signal having the depth information into the light field image signal by the equivalent optical model, correcting a difference in position between the plurality of light field segment images calculated from the equivalent optical model and the actual optical system by looking up a table or numerical fitting.

25. The light field display method according to claim 22, wherein converting the image signal having the depth information into the light field image signal by the equivalent optical model further comprises:
processing the content of the light field image required in a manner equivalent to equidistant or non-equidistant enlargement or minification caused by the equivalent sub-lenses, and then calculating the light field image segment regions corresponding to the equivalent projection target.

26. The light field display method according to claim 22, further comprising:
when the light field image required comprises a plurality of light field sub-images of different distances, causing a light field sub-image closer to the projection target to shield a light field sub-image farther away from the projection target.

* * * * *